April 3, 1945.   G. W. SMITH   2,372,687
SAW GUARD
Filed Nov. 13, 1943   4 Sheets-Sheet 2
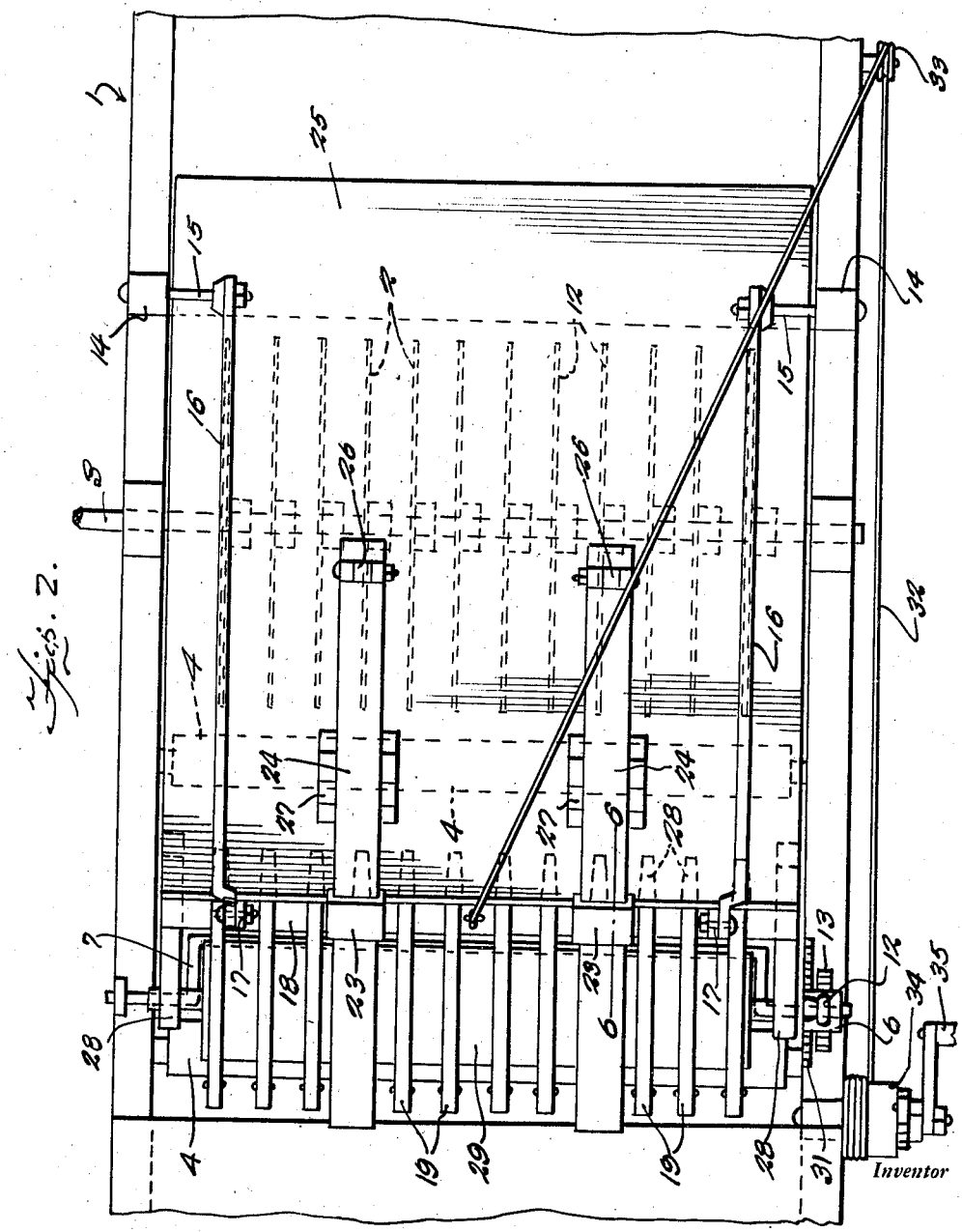
Inventor
GEORGE WASHINGTON SMITH
By Clarence A. O'Brien
and Harvey B. Jacobson
Attorneys

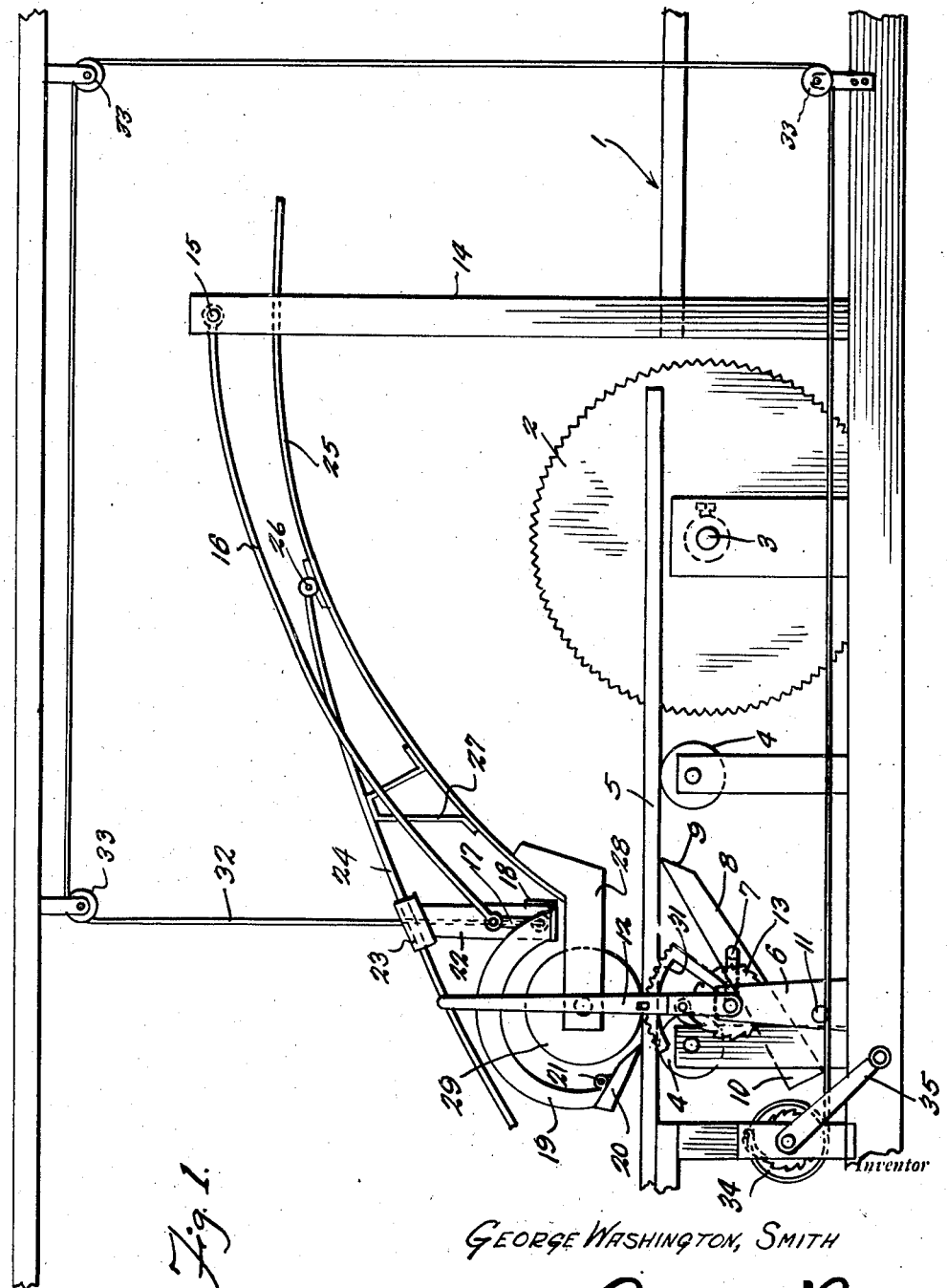

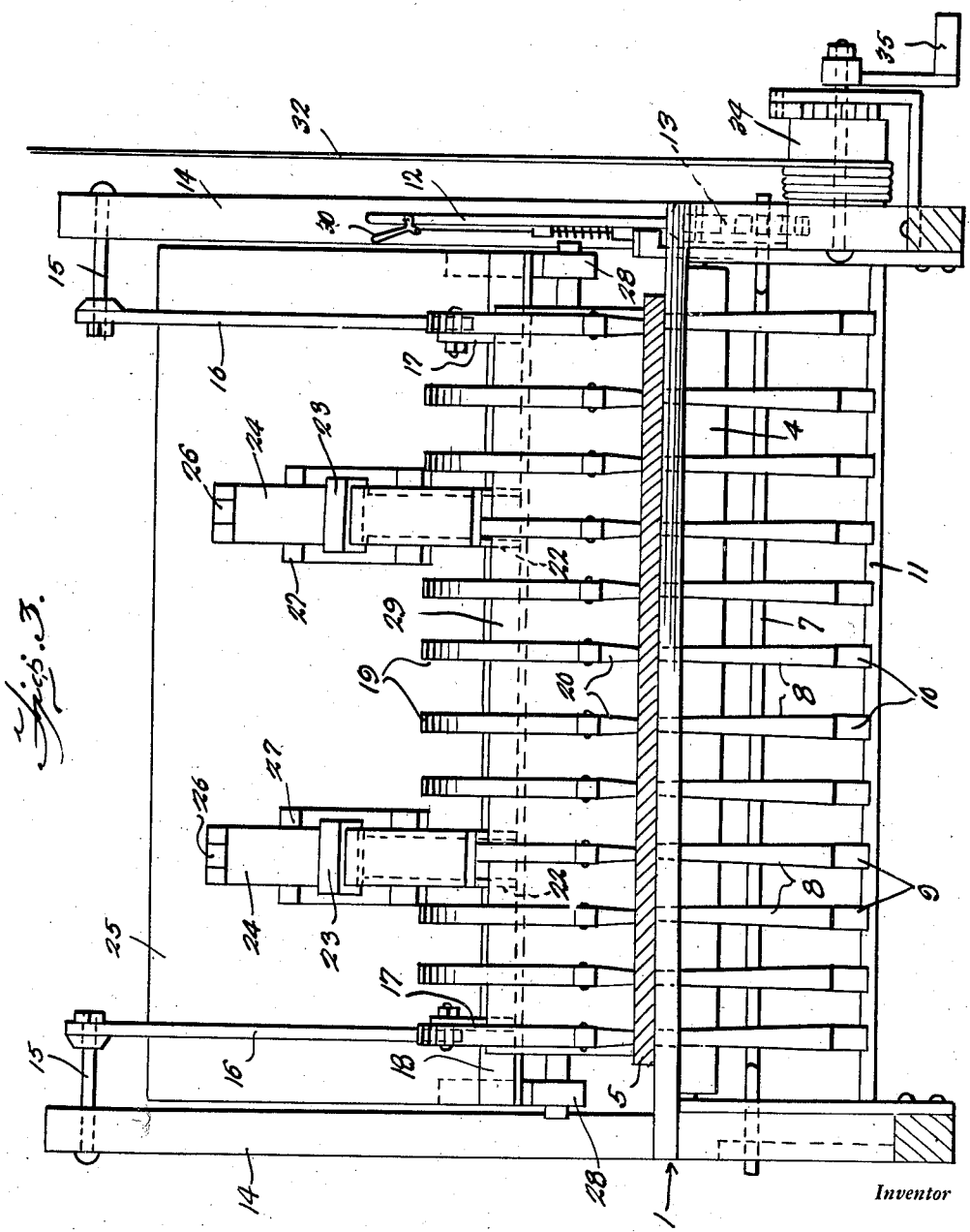

April 3, 1945.  G. W. SMITH  2,372,687
SAW GUARD
Filed Nov. 13, 1943  4 Sheets—Sheet 4
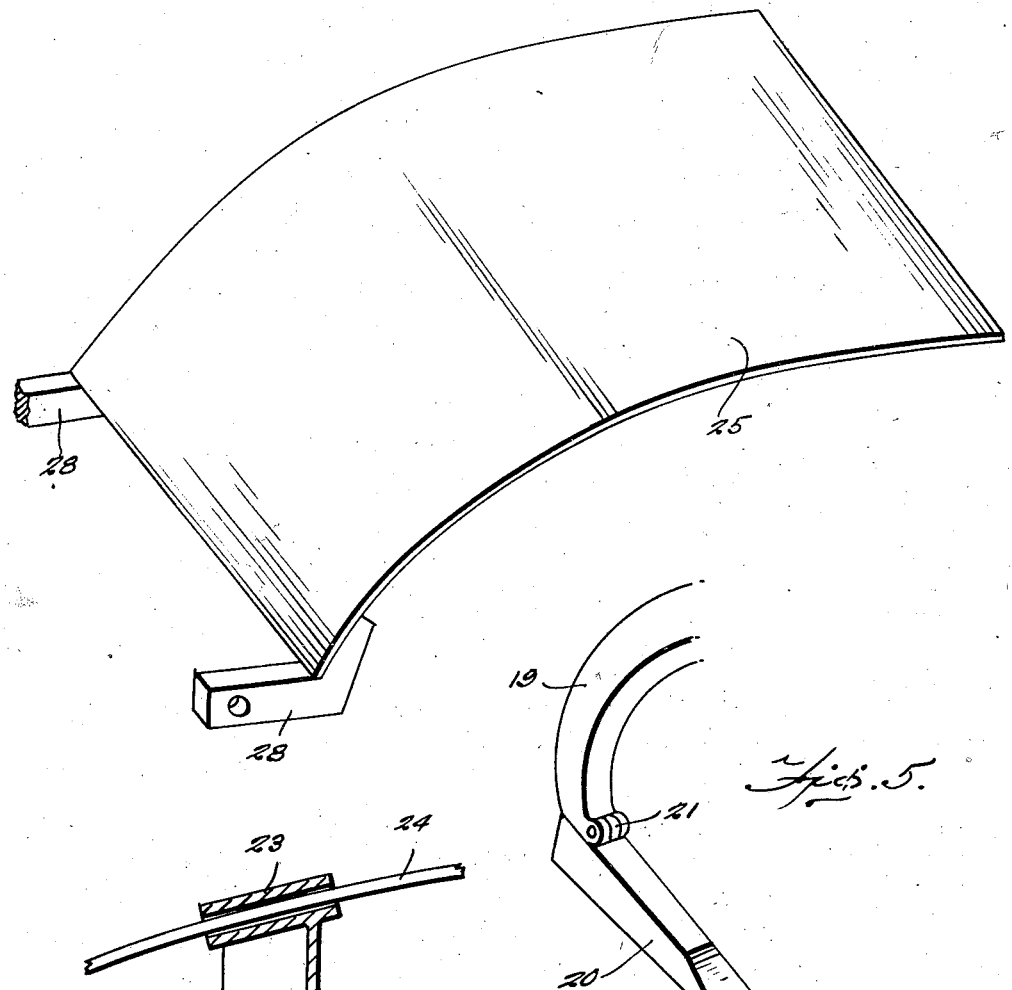
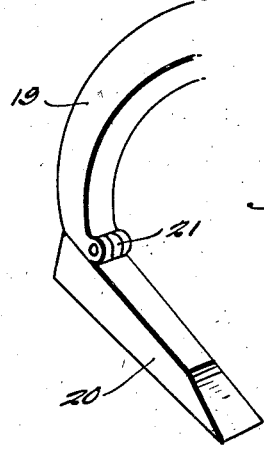
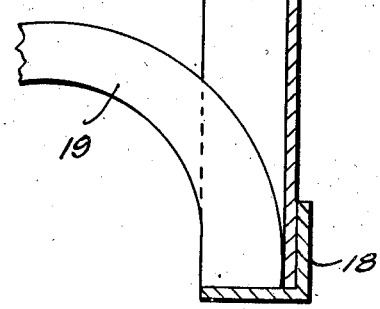
Inventor
GEORGE WASHINGTON SMITH
By Clarence A. O'Brien
and Harvey B. Jacobson
Attorneys Patented Apr. 3, 1945

2,372,687

UNITED STATES PATENT OFFICE 2,372,687

SAW GUARD

George Washington Smith, Kelseyville, Calif.

Application November 13, 1943, Serial No. 510,159

2 Claims. (Cl. 143—159)

The present invention relates to new and useful improvements in saw guards, or safety devices, for circular or buzz saw machines, and has for its primary object to provide, in a manner as hereinafter set forth, novel means for positively preventing the material from being kicked back by the saws with the possibility of seriously injuring persons standing nearby.

Another very important object of the invention is to provide a guard or safety device of the character described which may be expeditiously adjusted as desired.

Other objects of the invention are to provide a saw guard for circular saw machines which will be comparatively simple in construction, strong, durable, highly efficient and reliable in use, compact, and which may be manufactured at low cost.

All of the foregoing, and still further objects and advantages of the invention will become apparent from a study of the following specification, taken in connection with the accompanying drawings wherein like characters of reference designate corresponding parts throughout the several views, and wherein:

Figure 1 is a view in side elevation, showing a guard constructed in accordance with the present invention installed for operation on a circular saw machine.

Figure 2 is a top plan view thereof with the work omitted from the table.

Figure 3 is a view in rear elevation of the invention, showing the table structure of the saw machine in cross-section.

Figure 4 is a perspective view of the shield.

Figure 5 is a perspective view of one of the upper dogs.

Figure 6 is a fragmentary view in vertical section, taken substantially on the line 6—6 of Figure 2.

Referring now to the drawings in detail, it will be seen that reference numeral 1 designates a suitable bench or table in which a gang of circular saws 2 is operable. The saws 2 are adjustably mounted on a transverse shaft 3. In the embodiment shown, the table 1 includes rollers 4 ahead of the saws 2, over which rollers the work 5 travels to said saws.

Journaled in suitable supports 6 on the side portions of the table structure 1, also ahead of the saws 2, is a transverse crank shaft 7. Spaced dogs 8 are journaled, at an intermediate point, on the crank shaft 7 for swinging movement in a vertical plane. The dogs 8 include beveled blades 9 on one end which are adapted to bite into the material 5 to prevent reverse movement thereof. The other end portions 10 of the dogs 8 are relatively heavy for swinging the blades 9 upwardly into engagement with the material 5. A rod 11 extending transversely between the lower portions of the supports 6 functions as a stop for positively limiting the swinging movement of the dogs 8 under the influence of the heavy end portions 10 thereof.

A hand lever 12 is journaled on one end portion of the crank shaft 7. The hand lever 12 is operatively connected to the crank shaft 7 through a pawl and ratchet device 13.

Uprights 14 are mounted on the table structure 1. Projecting inwardly from the upper end portions of the uprights 14 are pivots 15. Rearwardly and downwardly curved metallic arms 16 are mounted for vertical swinging movement on the pivots 15. Suspended by hangers 17 from the free ends of the arms 16 is a transverse metallic bar 18. Arcuate arms 19 are fixed on the bar 18 and curve upwardly, rearwardly and downwardly therefrom to a point adjacent the work 5 on the table 1. Dogs 20 are pivotally mounted, at an intermediate point, as at 21, on the free ends of the arms 19. The dogs 20 are engageable by gravity with the work 5. The rear end portions of the dogs 20 are engageable beneath the free ends of the arms 19 for limiting downward swinging movement of the work-engaging ends of said dogs.

Posts 22 rise from the bar 18. Iinclined guides 23 are provided on the upper ends of the posts 22. Arcuate arms 24 are mounted for sliding adjustment in the guides 23. The arms 24 are operable between the arms 16.

An arcuate shield 25 is hingedly mounted, at an intermediate point, as at 26, on the forward ends of the arms 24 for vertical swinging movement. The forward end portion of the shield 25 projects between the uprights 14 and is engageable beneath the pivots 15 which function as a stop for limiting swinging movement of said shield in one direction relative to the arms 24. Chairs 27 are mounted on the rear portion of the shield 25 and are engageable beneath the arms 24 forwardlly of the guides 23 for limiting swinging movement of said shield in the opposite direction on said arms 24. Rearwardly projecting brackets 28 are mounted on the rear end portion of the shield 25. A roller 29, which is adapted to ride on the work 5, is journaled between the brackets 28.

It is thought that the operation of the device will be readily apparent from a consideration of the foregoing. Briefly, the material 5 is free to feed forwardly past the gang of saws 2 between the dogs 8 and 20 which, as hereinbefore stated, are engaged with said material by gravity. However, should the saws 2 foul and kick or throw the material back, the dogs 8 and 20 immediately bite thereinto for preventing any reverse movement thereof. The crank shaft 7 is actuated through the medium of the hand lever 12 for adjusting and resetting the lower dogs 8. A conventional latch 30 (Fig. 3) is provided on the lever 12 for engagement with a toothed segment 31 for releasably securing said lever in adjusted position. The roller 29 supports the upper assembly on the work 5. A cable 32 is connected, at one end, to the bar 18 for raising and lowering this upper assembly. The cable 32 is trained over pulleys 33 and secured to a drum 34 on the table structure 1 for winding thereon. In the embodiment shown, a hand crank 35 is provided for actuating the drum 34. However, said drum may be motor driven if desired. The guides 23 are retained by friction in adjusted position on the arms 24. Any rearward force exerted on the dogs 20, the arms 19, et cetera, causes the guides 23 to cock and bind on the arms 24.

It is believed that the many advantages of a saw guard constructed in accordance with the present invention will be readily understood, and although a preferred embodiment of the device is as illustrated and described, it is to be understood that changes in the details of construction and in the combination and arrangement of parts may be resorted to which will fall within the scope of the invention as claimed.

What is claimed is:

1. In a saw machine comprising a table and a plurality of circular saws operable thereon, said table being for the passage of material thereover to said saws, a guard comprising a crank shaft rotatably mounted on the table for the passage of material thereover to the saws, a plurality of spaced dogs journaled, at an intermediate point of each, on the crank of said crank shaft and engageable at one end beneath the material for securing said material against reverse movement on the table, and manually operable means for rotatably adjusting the crank shaft.

2. In a saw machine comprising a table and a gang of circular saws operable thereon, a guard including a pair of uprights on the table, a pair of arms mounted for vertical swinging movement on said uprights, a bar pivotally suspended from the free ends of the arms and extending transversely above the table, posts rising from the bar, guides on said posts, arms mounted for sliding adjustment in said guides, a shield hingedly mounted on one end of the second-named arms above the saws, chairs on the shield engageable beneath the second-named arms for limiting the swinging movement of said shield in one direction, a roller mounted on the shield and operable on a piece of work on the table, arms mounted on the bar, dogs pivotally mounted on the third-named arms and engageable by gravity with the work for retaining same against movement away from the bars, and a cable connected to the bar for raising and lowering same.

GEORGE WASHINGTON SMITH.